United States Patent
Kim et al.

(10) Patent No.: US 12,055,816 B2
(45) Date of Patent: Aug. 6, 2024

(54) COLOR CONVERSION PANEL

(71) Applicant: DONGWOO FINE-CHEM CO., LTD., Iksan-si (KR)

(72) Inventors: Hunsik Kim, Incheon (KR); Seulki Park, Pyeongtaek-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 111 days.

(21) Appl. No.: 17/766,063

(22) PCT Filed: Sep. 28, 2020

(86) PCT No.: PCT/KR2020/013214
§ 371 (c)(1),
(2) Date: Apr. 1, 2022

(87) PCT Pub. No.: WO2021/066455
PCT Pub. Date: Apr. 8, 2021

(65) Prior Publication Data
US 2022/0390799 A1 Dec. 8, 2022

(30) Foreign Application Priority Data

Oct. 4, 2019 (KR) .......... 10-2019-0123271
Oct. 4, 2019 (KR) .......... 10-2019-0123272

(51) Int. Cl.
G02F 1/1335 (2006.01)

(52) U.S. Cl.
CPC .............. *G02F 1/133614* (2021.01)

(58) Field of Classification Search
CPC ................................. G02F 1/133614
See application file for complete search history.

(56) References Cited

U.S. PATENT DOCUMENTS

2020/0227484 A1* 7/2020 Lin .......... H01L 33/502

FOREIGN PATENT DOCUMENTS

| CN | 104377226 A | 2/2015 |
|---|---|---|
| CN | 107544174 A | 1/2018 |
| CN | 107728368 A | 2/2018 |
| CN | 108139520 A | 6/2018 |
| CN | 110032030 A | 7/2019 |
| CN | 110047903 A | 7/2019 |
| CN | 110050511 A | 7/2019 |
| JP | 2014-93419 A | 5/2014 |
| JP | 2017-532599 A | 11/2017 |
| KR | 10-0759577 B1 | 9/2007 |

(Continued)

OTHER PUBLICATIONS

International Search Report for PCT/KR2020/013214 dated Jan. 12, 2021.
Written Opinion for PCT/KR2020/013214 dated Jan. 12, 2021.

*Primary Examiner* — Sean P Gramling
(74) *Attorney, Agent, or Firm* — Sughrue Mion, PLLC

(57) ABSTRACT

A color conversion panel includes a substrate, and a color conversion layer formed on the substrate. The color conversion layer includes a color conversion barrier rib that spatially separates a space on the substrate in pixel units, and a color conversion pixel inserted into the separated space of the color conversion barrier rib on the substrate and having a curved depression or a curved protrusion in a light incident direction or a curved protrusion in a light emission direction.

9 Claims, 15 Drawing Sheets

(56) References Cited

FOREIGN PATENT DOCUMENTS

| | | | |
|---|---|---|---|
| KR | 10-2008-0089156 A | 10/2008 |
| KR | 10-2013-0000506 A | 1/2013 |
| KR | 10-2013-0010382 A | 1/2013 |
| KR | 10-2015-0068816 A | 6/2015 |
| KR | 10-2016-0128257 A | 11/2016 |
| KR | 10-2017-0096583 A | 8/2017 |
| KR | 10-2017-0099026 A | 8/2017 |
| KR | 10-2018-0030353 A | 3/2018 |
| KR | 10-2018-0044474 A | 5/2018 |
| KR | 10-2018-0063687 A | 6/2018 |
| KR | 10-2018-0074664 A | 7/2018 |
| KR | 10-2018-0090421 A | 8/2018 |
| KR | 10-2018-0092326 A | 8/2018 |
| KR | 10-2018-0099991 A | 9/2018 |
| KR | 10-2019-0009871 A | 1/2019 |
| KR | 10-2019-0050886 A | 5/2019 |
| KR | 10-2019-0057190 A | 5/2019 |
| KR | 10-2019-0063619 A | 6/2019 |
| KR | 10-2019-0090114 A | 8/2019 |

\* cited by examiner

【Figure 1A】
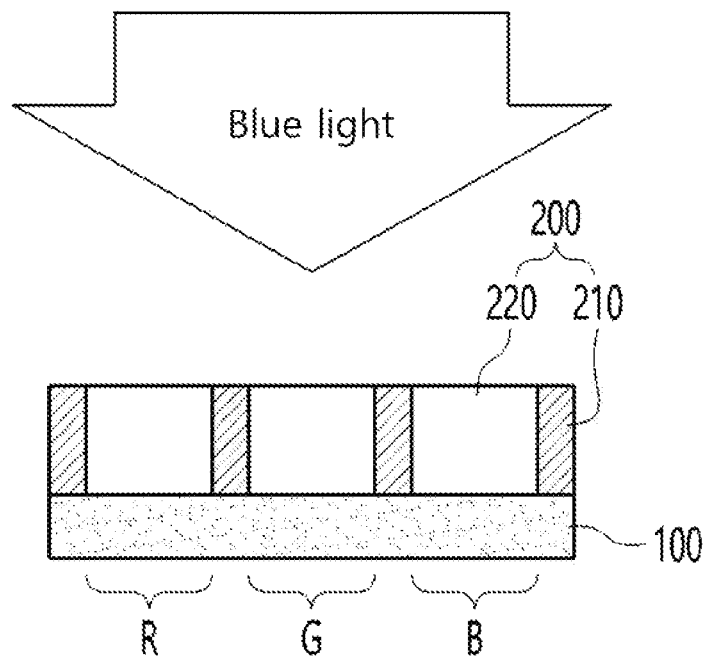
【Figure 1B】
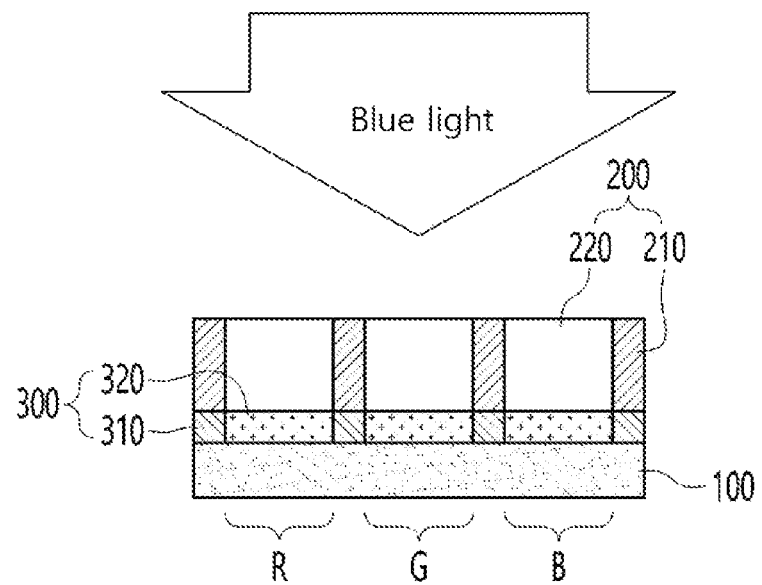

[Figure 1C]
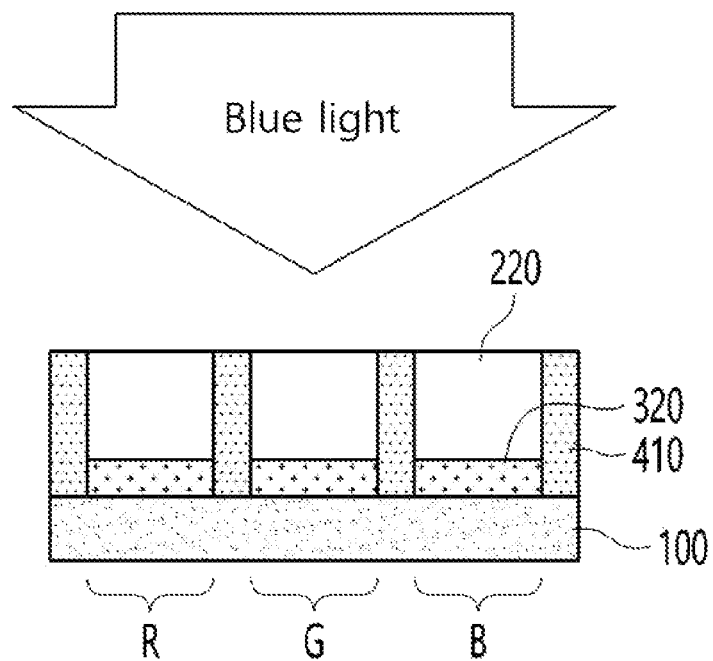
[Figure 2A]
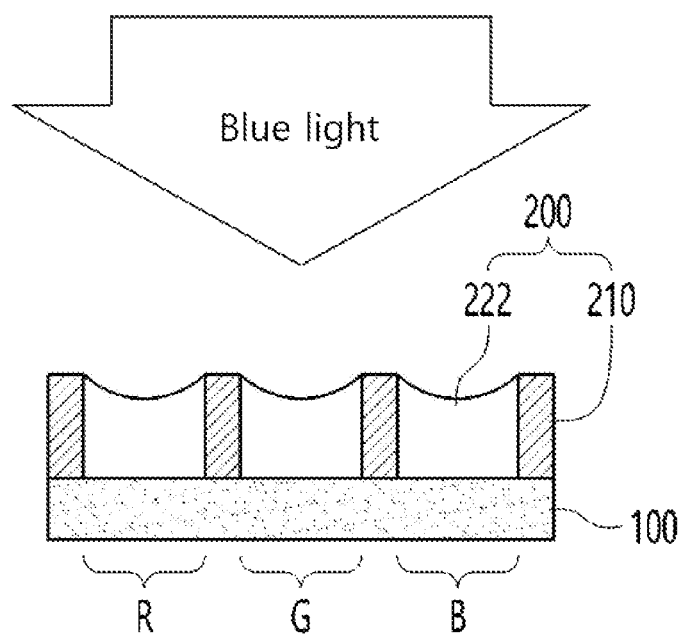

【Figure 2B】
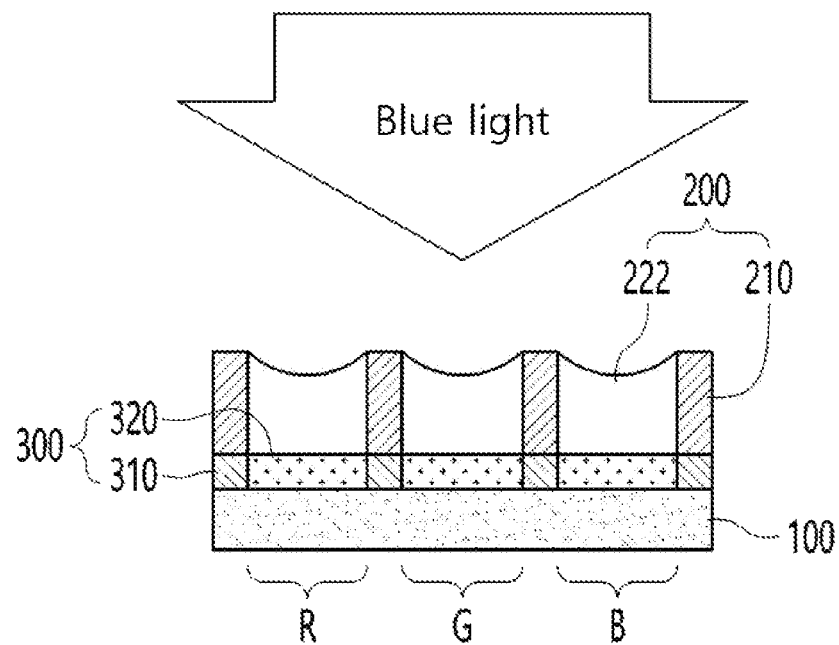
【Figure 2C】
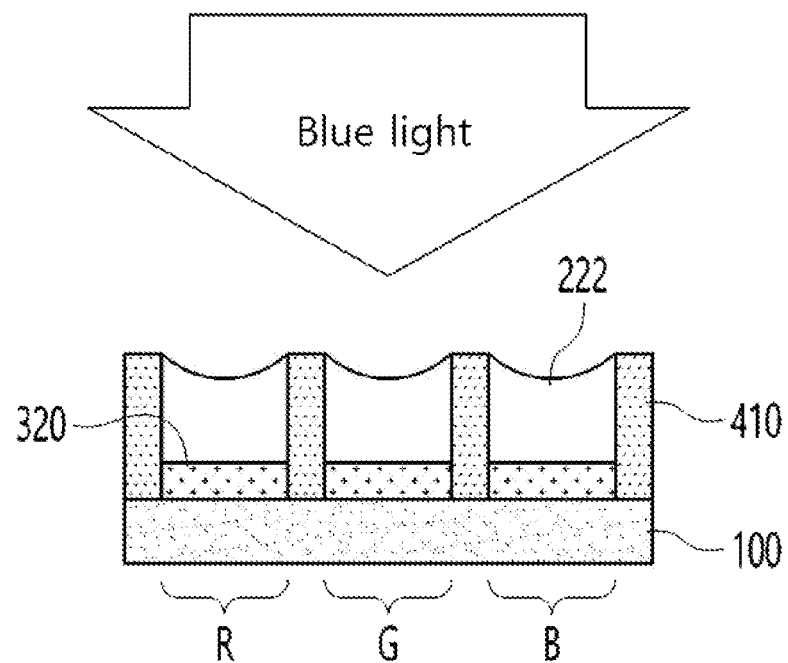

【Figure 3A】
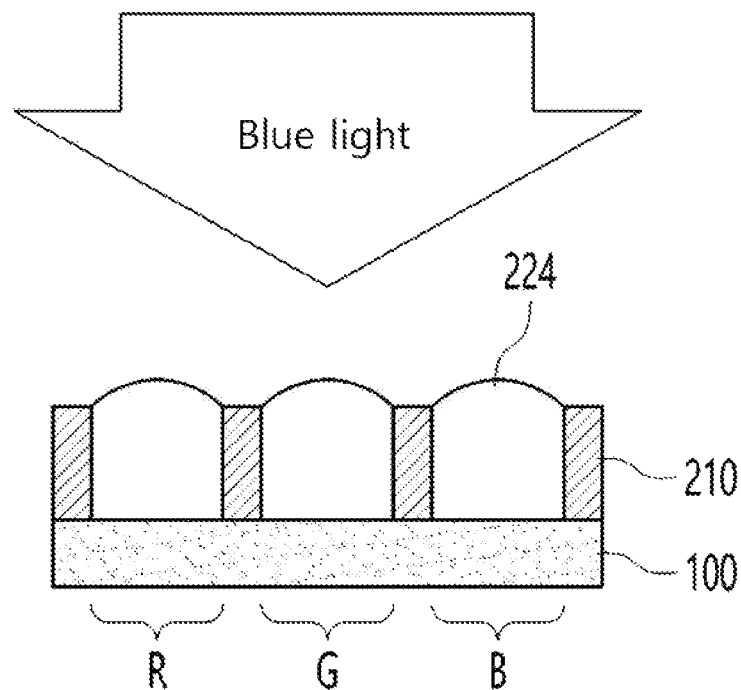
【Figure 3B】
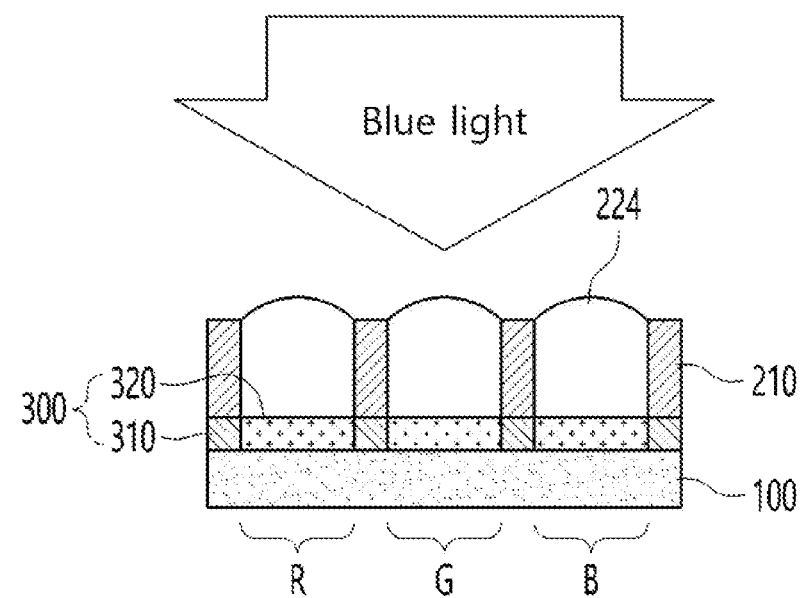

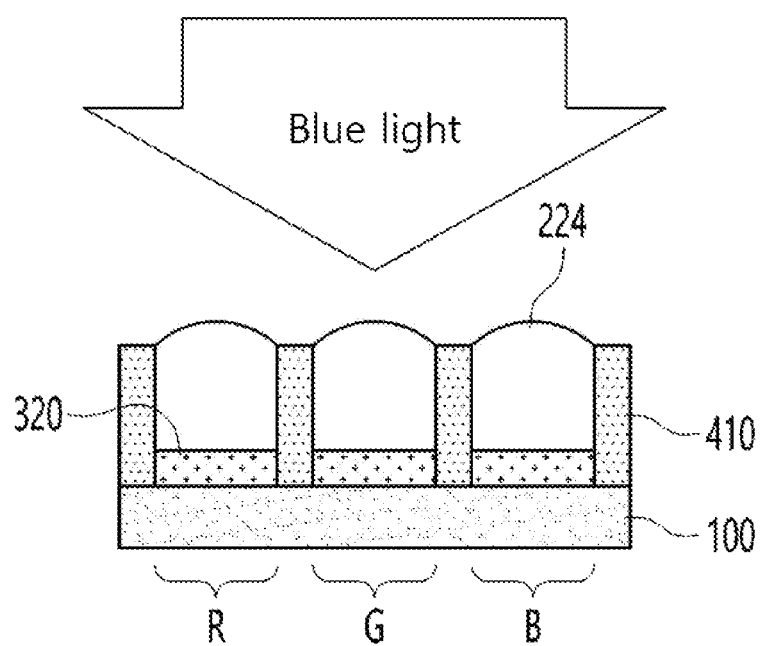

【Figure 4】
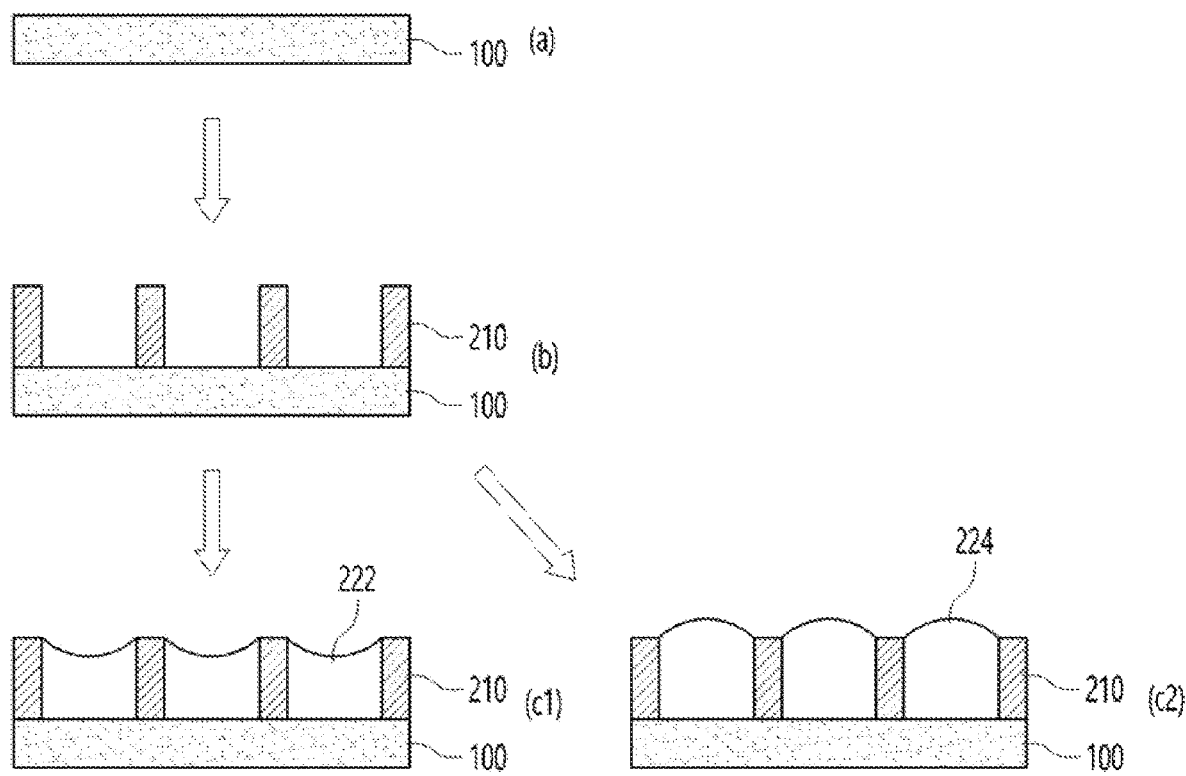

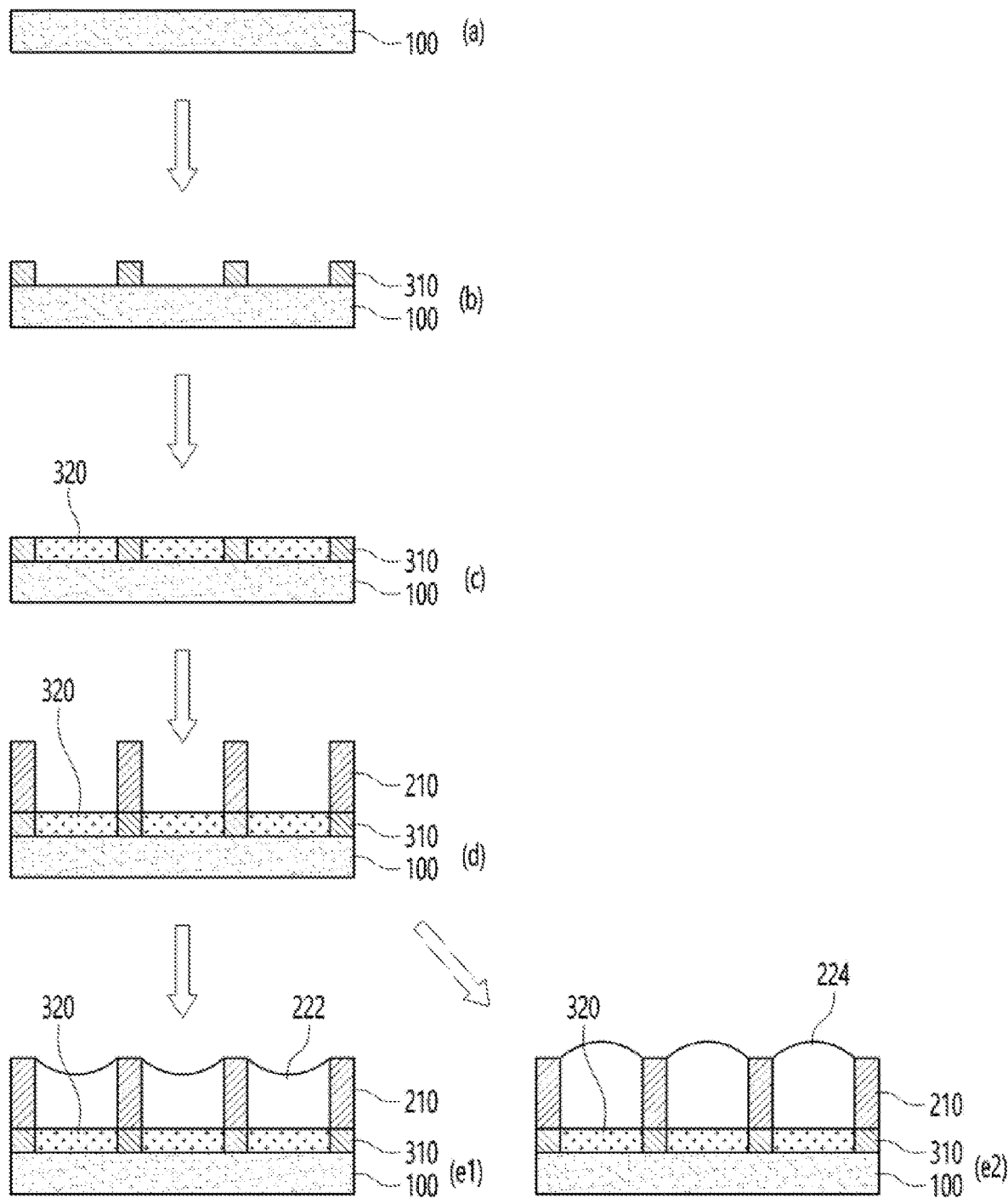
[Figure 5]

[Figure 6]
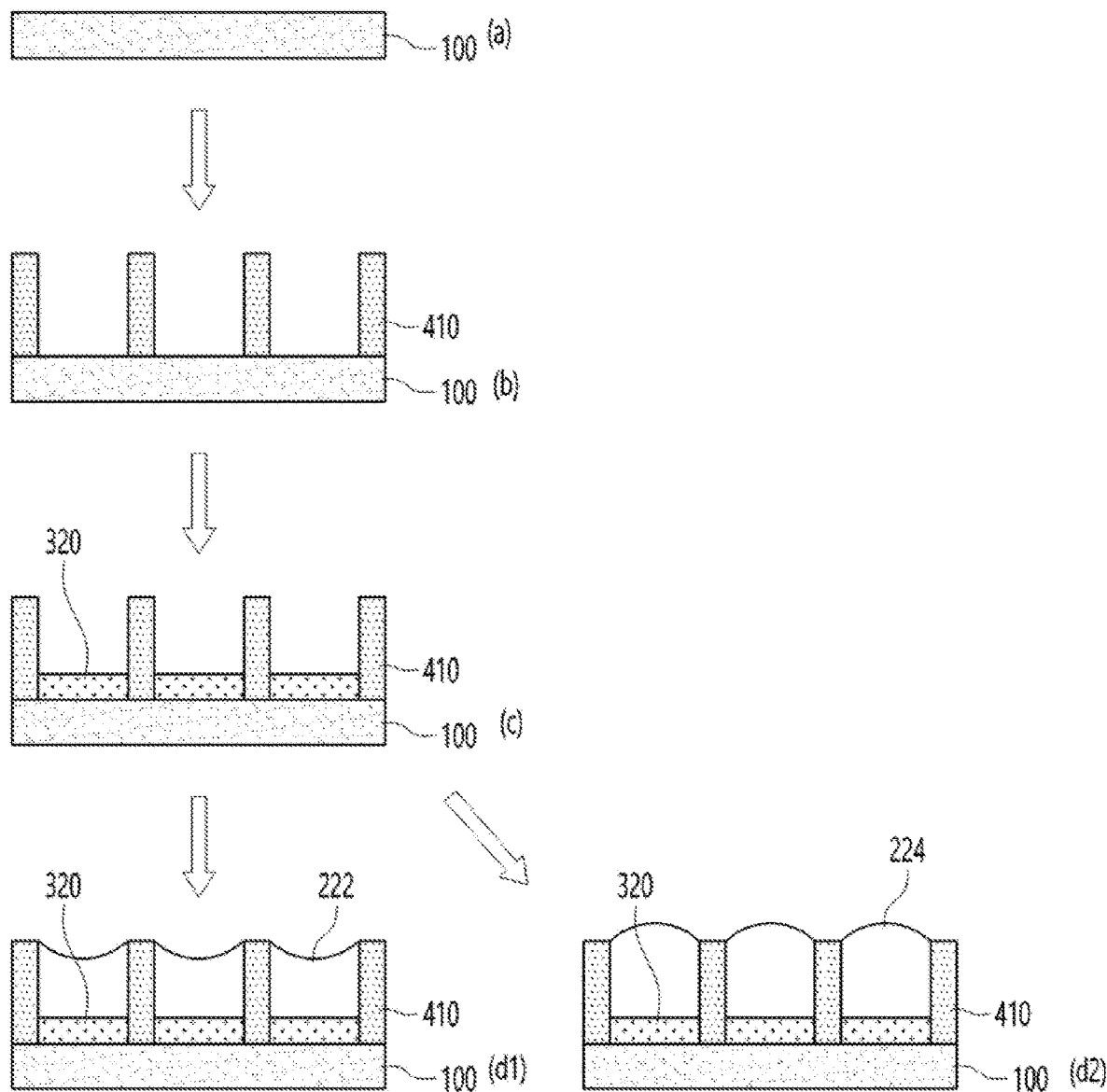

【Figure 7A】
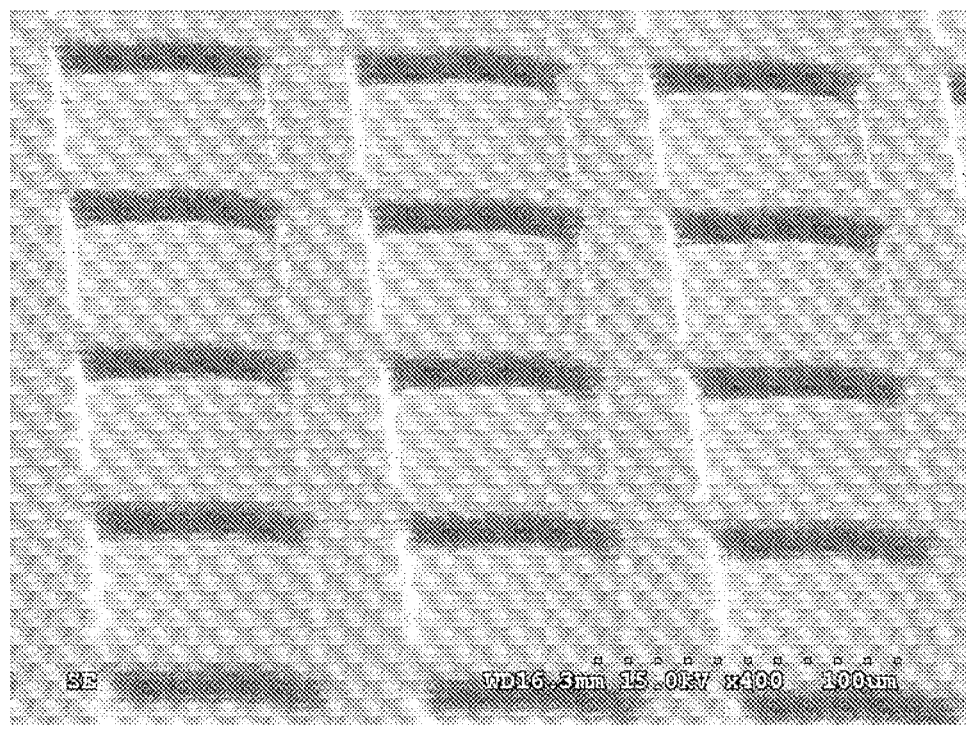
【Figure 7B】
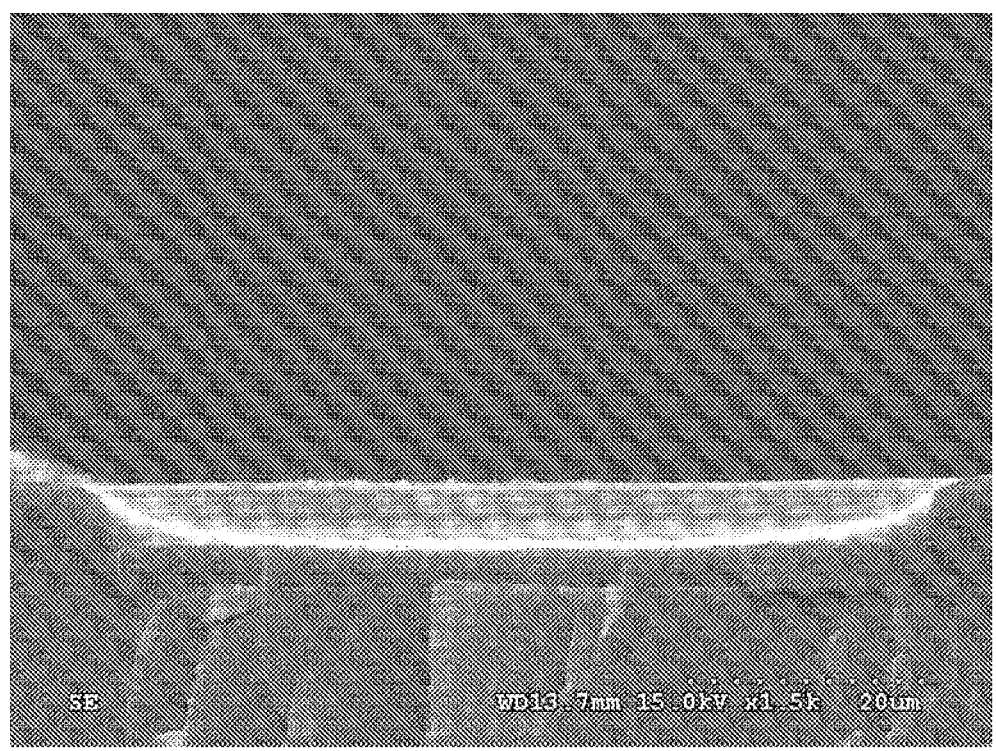

【Figure 8A】
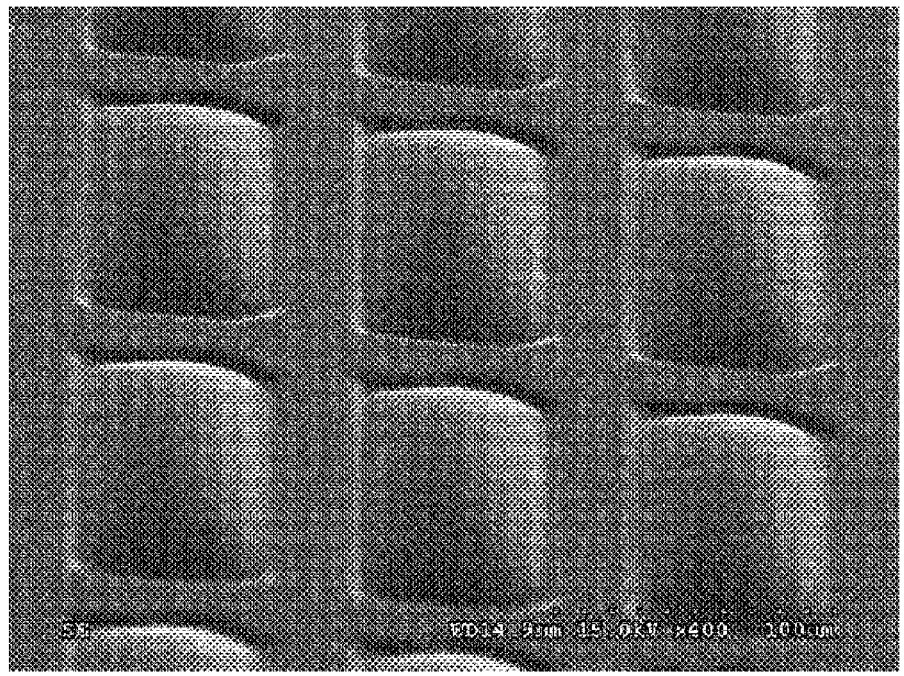
【Figure 8B】

【Figure 9A】
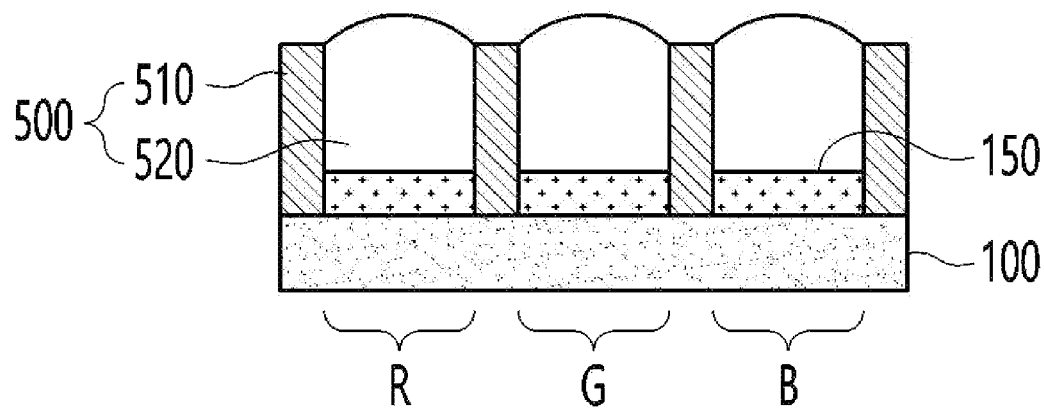
【Figure 9B】
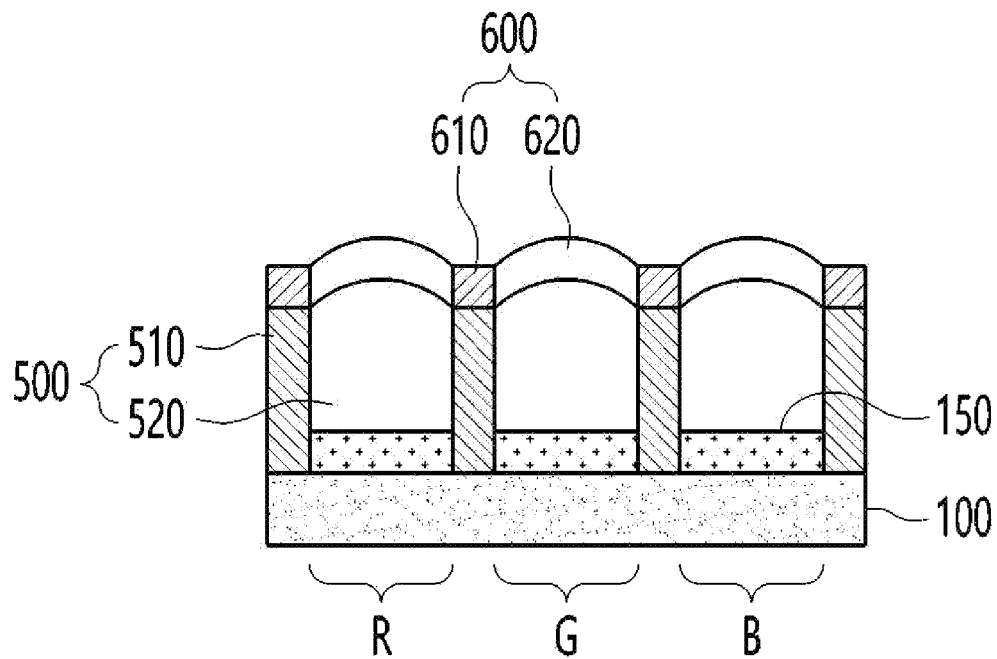

[Figure 9C]
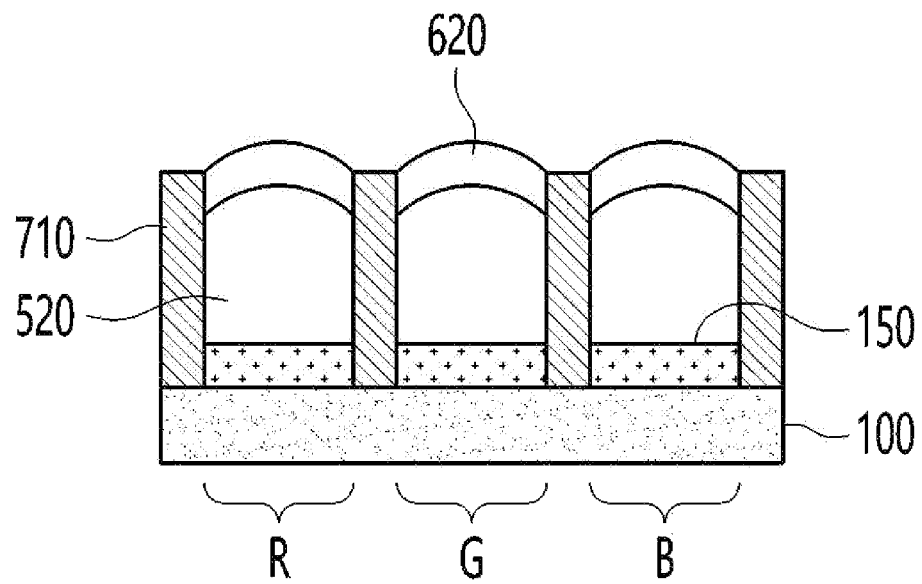
[Figure 10A]
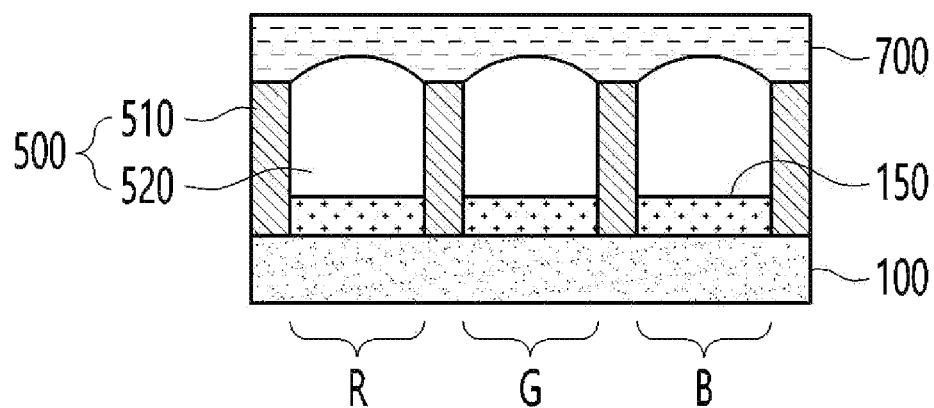

【Figure 10B】
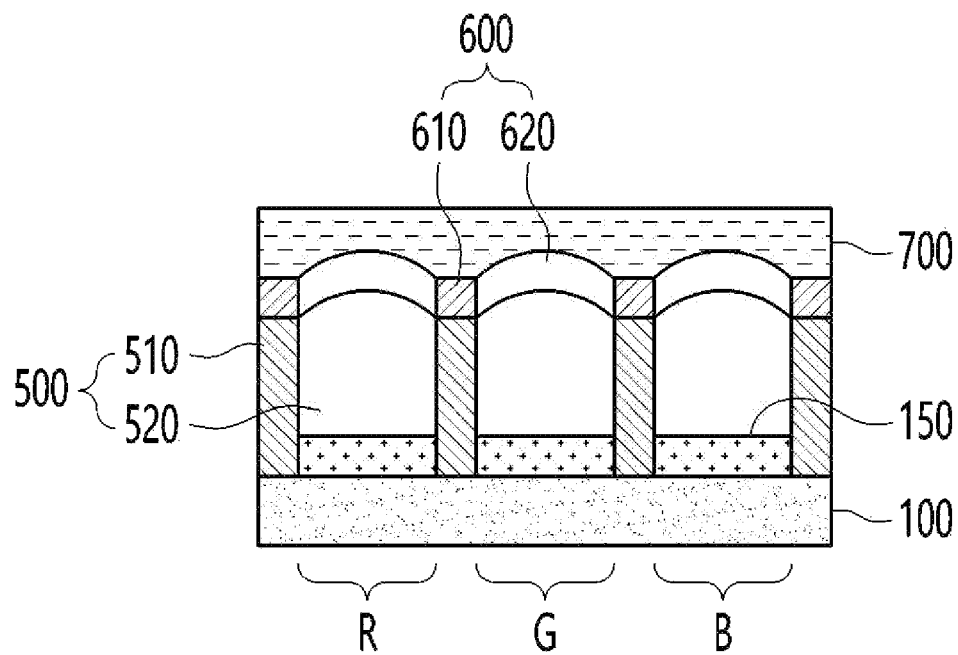
【Figure 10C】
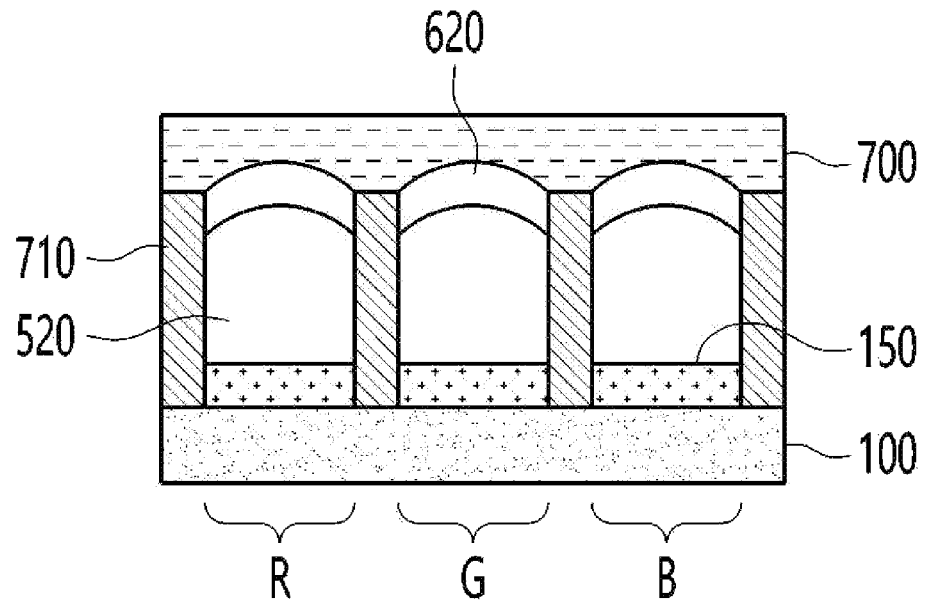

【Figure 11A】
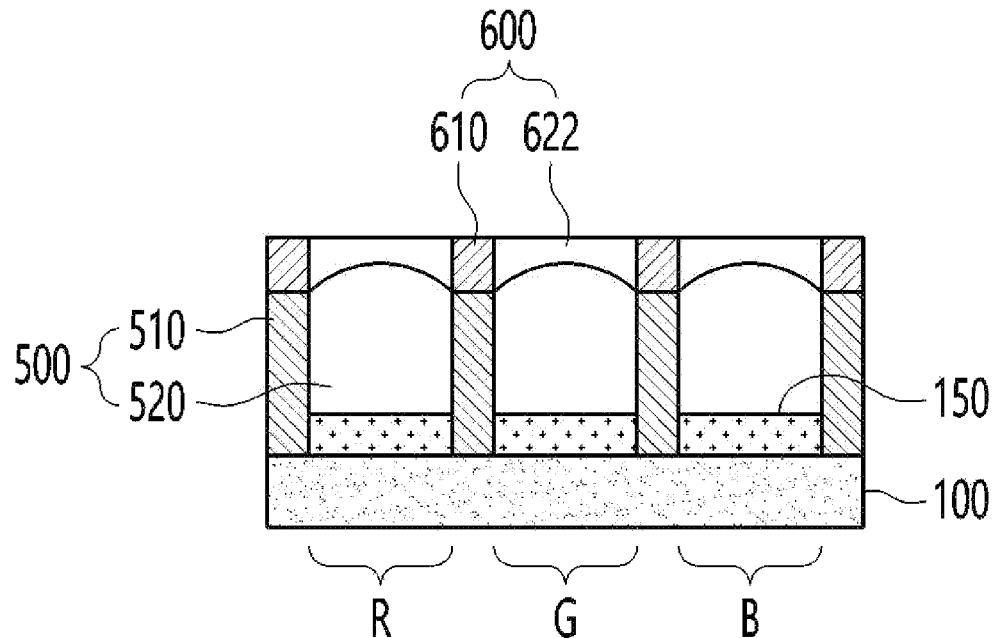
【Figure 11B】
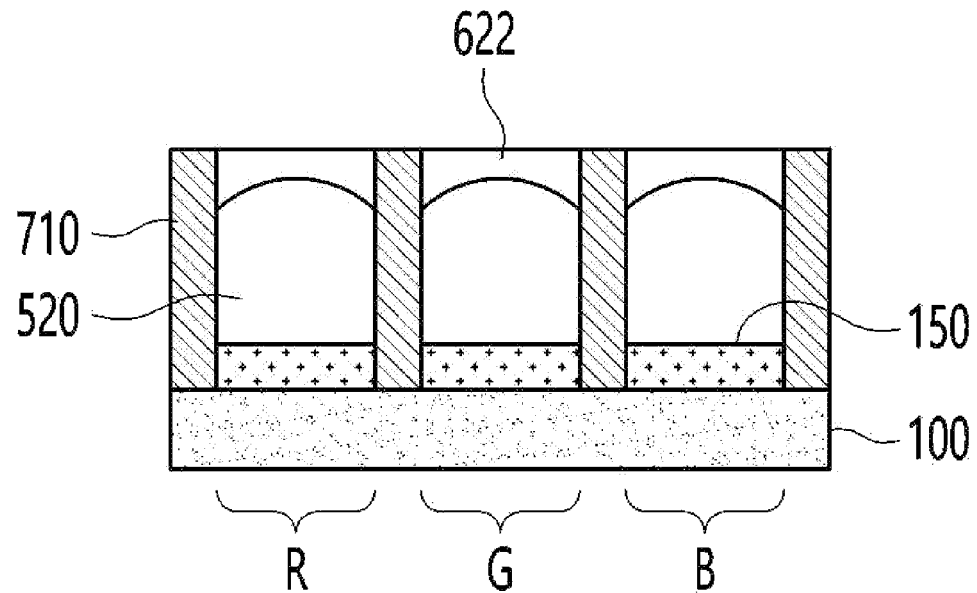

[Figure 12]
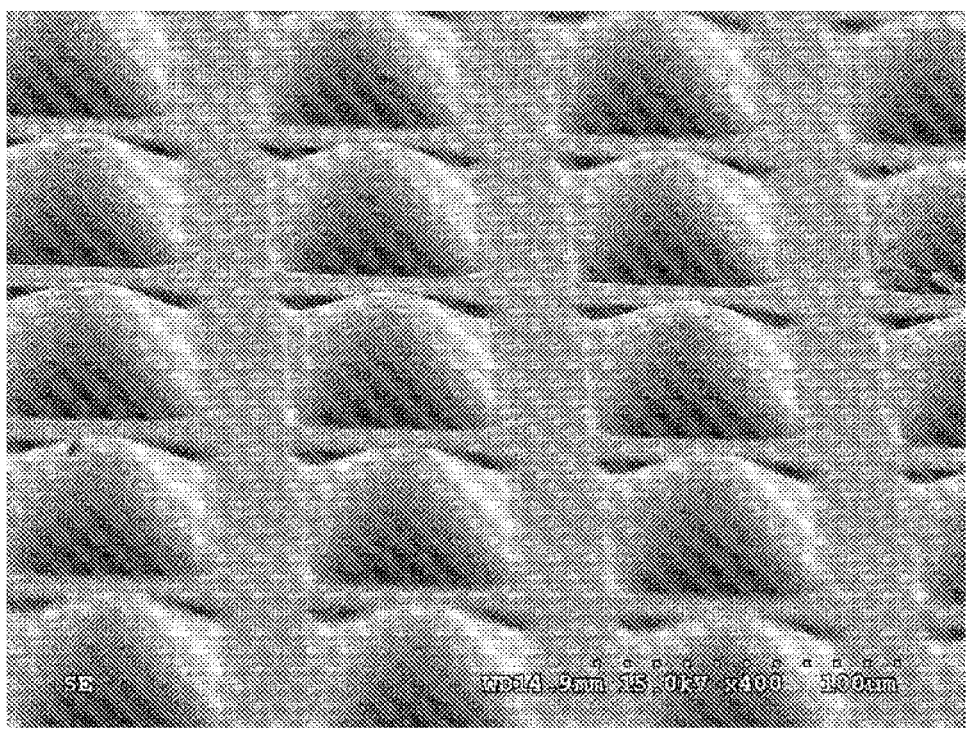

COLOR CONVERSION PANEL

CROSS REFERENCE TO RELATED APPLICATIONS

This is a National Stage of International Application No. PCT/KR2020/013214 filed Sep. 28, 2020, claiming priority based on Korean Patent Application No. 10-2019-0123271 filed Oct. 4, 2019 and Korean Patent Application No. 10-2019-0123272 filed Oct. 4, 2019, the contents of all of which are incorporated herein by reference in their entirety.

TECHNICAL FIELD

The present invention relates to a display device. Particularly, the present invention relates to a color conversion panel having improved luminance, viewing angle, and luminance uniformity.

BACKGROUND ART

A liquid crystal display is one of the widely used flat panel displays. A liquid crystal display includes two display panels, on which electric field generating electrodes such as a pixel electrode and a common electrode are formed, and a liquid crystal layer interposed therebetween.

A liquid crystal display uses a color filter panel for color formation. However, when the light emitted from the backlight light source is filtered to red, green, and blue to exhibit a color, since the light is selected by blocking the white light source, there is a problem of low luminance.

However, in the case of a color conversion panel researched recently, the initial light source is generated in blue and the color is displayed in a conversion method rather than blocking. Therefore, the color conversion panel can exhibit higher light (luminance) if all of the initial light is converted and used. However, since the research is still insufficient, there is a problem of non-uniformity such as a difference in luminance of light in one pixel. In addition, the conversion performance is also insufficient, resulting in a difference in luminance depending on the viewing angle.

FIGS. 1A to 1C are cross-sectional views of a color conversion panel according to the prior art.

As shown in FIG. 1A, the conventional color conversion panel includes a substrate 100, a color conversion layer 200, and so on. The color conversion layer 200 may be composed of a color conversion barrier rib 210, a color conversion pixel 220, and the like. The color conversion layer 200 may further include a color filter layer 300, as shown in FIGS. 1B and 1C.

As shown in FIGS. 1A to 1C, the substrate 100 acts as a base supporting the color conversion barrier rib 210 and the color conversion pixel 220. The color conversion barrier rib 210 provides a space for separating and embedding the color conversion pixel 220. And, when receiving blue light from the backlight light source, the color conversion pixel 220 converts the blue light incident on the pixel into red light or green light, or maintains it as blue light to emit.

In the conventional color conversion panel, the surfaces of the color conversion pixel 220 in the light incident direction and the light emission direction are flat. In a display device having this type of color conversion pixel 220, front luminance (lux), luminance at a viewing angle of 30° (% compared to the front), and a ratio of minimum luminance to maximum luminance between the front and the viewing angle of 30° (luminance uniformity, %) were measured, using a blue LED 30 mW light source. The structure of FIG. 1A showed 235 lux, 85%, and 80%, respectively, the structure of FIG. 1B showed 221 lux, 82%, and 81%, respectively, and, the structure of FIG. 1C showed 225 lux, 83%, and 81%, respectively.

However, in the display device having the color conversion panel of the shapes of FIGS. 1A to 1C, the measured front luminance is less than 250 lux, which needs to be improved. The luminance of the viewing angle of 30° is less than 90% compared to the front luminance, which also needs to be improved. In addition, the deviation (luminance non-uniformity) between the maximum luminance and the minimum luminance between the front and the viewing angle of 30° is close to 20%, which needs to be improved as well.

DISCLOSURE OF INVENTION

Technical Problem

An object of the present invention is to solve the problems of the prior art and provide a color conversion panel, which can suppress the external light reflection and increase the front luminance, increase the luminance at a viewing angle of 30° to the front luminance, increase the minimum luminance between the front and the viewing angle of 30° and improve the luminance uniformity, increase the viewing angle up to 80° or more, and increase the aperture ratio.

Technical Solution

A color conversion panel of the present invention for achieving this purpose may be composed of a substrate and a color conversion layer. The color conversion layer may be composed of a color conversion barrier rib, a color conversion pixel, and so on.

The substrate may support the color conversion barrier rib and the color conversion pixel.

The color conversion barrier rib may spatially separate the color conversion pixel in pixel units on the substrate.

The color conversion pixel may be inserted into the separated space of the color conversion barrier rib on the substrate. The color conversion pixel may form a curved depression or a curved protrusion in a light incident direction.

In the color conversion panel of the present invention, the color conversion pixel may have a thickness of 5 to 20 μm. The curved depression or the curved protrusion may have a maximum depression depth or a maximum protrusion height of 5 to 50% of the thickness of the color conversion pixel.

In the color conversion panel of the present invention, the curved depression or the curved protrusion may have a circular or elliptical shape.

In the color conversion panel of the present invention, the color conversion pixel may be formed by an inkjet method.

The color conversion panel of the present invention may further comprise a color filter layer between the substrate and the color conversion layer.

The color filter layer may include a color filter barrier rib and a color filter pixel.

The color filter barrier rib may be coupled between the substrate and the color conversion barrier rib.

The color filter pixel may be inserted in the color conversion barrier rib.

In the color conversion panel of the present invention, the color conversion barrier rib and the color filter barrier rib may be of a separate type, which are formed separately and stacked.

In the color conversion panel of the present invention, the color conversion barrier rib and the color filter barrier rib may be of an integrated type, which are formed simultaneously.

In the color conversion panel of the present invention, the color filter pixel and the color conversion pixel may be formed by an inkjet method.

Another example of a color conversion panel of the present invention may be composed of a substrate and a color conversion layer. In the substrate, a plurality of light sources may be spaced apart and combined. The color conversion layer may be composed of a color conversion barrier rib, a color conversion pixel, and so on.

The color conversion barrier rib may spatially separate a space in pixel units while embedding the light source on the substrate. The color conversion pixel may be inserted into the separated space of the color conversion barrier rib and having a curved protrusion in a light emission direction.

In another example of a color conversion panel of the present invention, the color conversion pixel has a thickness of 5 to 20 μm. A maximum protrusion height of the curved protrusion may be 5 to 50% of the thickness of the color conversion pixel.

In another example of a color conversion panel of the present invention, the curved protrusion may have a circular or elliptical shape.

In another example of a color conversion panel of the present invention, the color conversion pixel may be formed by an inkjet method.

Another example of a color conversion panel of the present invention may further comprise a color filter layer coupled to the color conversion layer in the light emission direction.

The color filter layer may include a color filter barrier rib formed on the color conversion barrier rib and a color filter pixel inserted in the color filter barrier rib.

In another example of a color conversion panel of the present invention, the color filter pixel has a curved color filter protrusion in the light emission direction.

In another example of a color conversion panel of the present invention, the color filter pixel may have a thickness of 1 to 10 μm. A maximum protrusion height of the curved color filter protrusion may be 5 to 50% of the thickness of the color filter pixel.

In another example of a color conversion panel of the present invention, the curved color filter protrusion may have a circular or elliptical shape.

In another example of a color conversion panel of the present invention, the color filter pixel may be formed by an inkjet method.

In another example of a color conversion panel of the present invention, the color conversion barrier rib and the color filter barrier rib may be of a separate type, which are formed separately and stacked.

In another example of a color conversion panel of the present invention, the color conversion barrier rib and the color filter barrier rib may be of an integrated type, which are formed simultaneously.

Advantageous Effects

According to the present invention having such a configuration, the luminance in the front direction can be increased by forming the curved depression or the curved protrusion in the light incident direction of the color conversion pixel. In addition, the present invention can provide an excellent viewing angle by improving luminance at a viewing angle of 30°.

According to the present invention, the luminance uniformity (ratio of the minimum luminance to the maximum luminance) can be improved from the front to the viewing angle of 30° by forming the curved depression or the curved protrusion in the light incident direction of the color conversion pixel.

In addition, in the present invention, by forming the curved protrusion in the light emission direction of the color conversion pixel and/or the color filter layer, it is possible to suppress external light reflection occurring in the display direction of the display device by 10% or more, further enlarge the viewing angle by 10° or more, and increase the aperture ratio by 2% p or more.

DESCRIPTION OF DRAWINGS

FIGS. 1A to 1C are cross-sectional views illustrating a color conversion panel according to the prior art.

FIGS. 2A to 2C are cross-sectional views illustrating a first embodiment of a color conversion panel according to the present invention and modifications thereof.

FIGS. 3A to 3C are cross-sectional views illustrating a second embodiment of a color conversion panel according to the present invention and modifications thereof.

FIG. 4 is a process cross-sectional view illustrating a first method of manufacturing a color conversion panel according to the present invention.

FIG. 5 is a process cross-sectional view illustrating a second method of manufacturing a color conversion panel according to the present invention.

FIG. 6 is a process cross-sectional view illustrating a third method of manufacturing a color conversion panel according to the present invention.

FIGS. 7A and 7B are top and side view photographs of an actual example of the first embodiment of the color conversion panel according to the present invention, taken with an electron microscope.

FIGS. 8A and 8B are top and side view photographs of an actual example of a second embodiment of a color conversion panel according to the present invention, taken with an electron microscope.

FIGS. 9A to 9C are cross-sectional views illustrating a third embodiment of a color conversion panel according to the present invention and modifications thereof.

FIGS. 10A to 10C are cross-sectional views illustrating a fourth embodiment of a color conversion panel according to the present invention and modifications thereof.

FIGS. 11A and 11B are cross-sectional views illustrating a fifth embodiment of a color conversion panel according to the present invention and a modification thereof.

FIG. 12 is a top view photograph of an actual example of the third embodiment of the color conversion panel according to the present invention, taken with an electron microscope.

BEST MODE

Hereinafter, the present invention will be described in detail with reference to the accompanying drawings.

FIGS. 2A to 2C are cross-sectional views illustrating a first embodiment of a color conversion panel according to the present invention and modifications thereof.

As shown in FIG. 2A, the color conversion panel according to the present invention may include a substrate 100 and a color conversion layer 200.

The substrate 100 supports the color conversion layer 200, and may be made of transparent material such as glass, plastic, or the like. The substrate 100 may be made of a flexible or rigid material.

The color conversion layer 200 may include a color conversion barrier rib 210, a color conversion pixel 220, and so on.

The color conversion barrier rib 210 may be formed on the substrate 100. The color conversion barrier rib 210 may space the color conversion pixels 222 apart from each other in pixel units. The color conversion barrier rib 210 may surround and embed the color conversion pixel 222 on the substrate 100. The color conversion barrier rib 210 may be configured to open in a direction away from the substrate 100.

The color conversion barrier rib 210 may be formed of an acrylic or epoxy-based polymer.

The color conversion barrier rib 210 may have the maximum thickness of the color conversion pixel 222, and may have a thickness range of, for example, 5 to 20 μm.

The opening of the color conversion barrier rib 210 may have various shapes such as a circle, an ellipse, a triangle, a square, or the like.

The color conversion pixel 222 may be embedded in the color conversion barrier rib 210 on the substrate 100.

The color conversion pixel 222 may include a color conversion member that converts the color of incident light. The color conversion member may include quantum dots. When light of a wavelength having energy greater than the band gap of the quantum dot is irradiated, the quantum dot may absorb incident light to enter an excited state, and then fall to a ground state while emitting light of a specific wavelength. In this case, the quantum dot emits light of a wavelength corresponding to the band gap. Quantum dots may have different emission wavelengths depending on their size. Quantum dots are usually able to emit light of shorter wavelengths as they get smaller. For example, when light (e.g., blue light) from the outside is incident on the color conversion pixel 222, red light having a wavelength of about 620 nm to 670 nm or green light having a wavelength of about 520 nm to 570 nm may be emitted, or blue light may be emitted by passing the incident blue light as it is.

The quantum dots may be selected from Group II-VI compounds, Group III-V compounds, Group IV-VI compounds, Group IV elements, Group IV compounds, combinations thereof, and alloys thereof. The alloy may include an alloy of the aforementioned compound and a transition metal.

Group II-VI compounds include CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe, HgZnSTe, etc., Group III-V compounds include GaN, GaP, GaAs, AlN, AlP, AlAs, InN, InP, InAs, GaNP, GaNAs, GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, InAlPAs, etc., and Group IV-VI compounds include SbTe, etc.

The color conversion pixel 222 may include scattering particles in the color conversion member. The scattering particles may scatter the light incident on the color conversion pixel 222 to make the front luminance and the lateral luminance of the emitted light uniform. The scattering particles may include inorganic oxide particles, organic particles, or combinations thereof. The scattering particles may include $BiFeO_3$, $Fe_2O_3$, $WO_3$, $TiO_2$, $SiC$, $BaTiO_3$, $ZnO$, $ZrO_2$, $ZrO$, $Ta_2O_5$, $MoO_3$, $TeO_2$, $Nb_2O_5$, $Fe_3O_4$, $V_2O_5$, $Cu_2O$, $BP$, $Al_2O_3$, $In_2O_3$, $SnO_2$, $Sb_2O_3$, ITO, or combinations thereof.

The color conversion pixel 222 may include a color filter pigment. In this case, the color conversion panel may include only the color conversion layer 200 and may not separately include the color filter layer, as shown in FIG. 2A.

As shown in FIG. 2A, the color conversion pixel 222 may form a curved depression in the light incident direction. The curved depression may have a circular shape, an elliptical shape, or the like. The curved depression may be formed by forming the color conversion member with an inkjet method.

The curved depression may have a maximum depression depth of 5 to 50% of the thickness of the color conversion pixel 222. When the color conversion pixel 222 is configured to have a thickness of 5 to 20 μm, the maximum depression depth of the curved depression may be in the range of 0.25 to 10 μm. When the maximum depression depth is set to less than 5%, that is, 0.25 μm, it is difficult to improve the front luminance by 10% or more. When the maximum depression depth is set to more than 50%, that is, 10 μm, the thickness of the color conversion pixel 222 may be insufficient, and the color conversion rate may drop by 15% or more. As a result, the improvement effect of the front luminance, the luminance at a viewing angle of 30°, and the luminance uniformity from the front to a viewing angle of 30° obtained by the formation of the curved depression can be offset.

In the embodiment of FIG. 2A, an experiment was conducted in which the maximum depression depth (the depth of the central region) of the curved depression was changed with the thickness of the color conversion pixel 222 of 10 μm. Table 1 below shows front luminance (lux), luminance at a viewing angle of 30°, and luminance uniformity from the front to a viewing angle of 30° in this experiment.

TABLE 1

| Maximum depression depth of curved depression (μm) | Front luminance (lux) | Luminance at viewing angle of 30° (%) | Luminance uniformity (%) |
| --- | --- | --- | --- |
| 0 (coplanar) | 215 | 82 | 78 |
| 0.25 | 216 | 83 | 79 |
| 0.5 | 225 | 88 | 85 |
| 0.75 | 227 | 91 | 87 |
| 1.0 | 227 | 92 | 88 |
| 1.5 | 232 | 92 | 90 |
| 2.0 | 234 | 93 | 93 |
| 2.5 | 234 | 93 | 93 |
| 3.0 | 237 | 93 | 95 |
| 3.5 | 230 | 91 | 94 |
| 4.0 | 225 | 90 | 92 |
| 4.5 | 222 | 90 | 90 |
| 5.0 | 221 | 88 | 88 |
| 5.5 | 217 | 83 | 79 |
| 6.0 | 215 | 82 | 77 |
| 6.5 | 215 | 82 | 77 |

As shown in Table 1 above, it can be confirmed that the maximum depression depth of the curved depression in the range of 5 to 50% of the thickness of the color conversion pixel 220, that is, 0.5 to 5.0 μm is preferable, based on the criteria that satisfy the front luminance of 220 or more, the luminance at a viewing angle of 30° of 85% or more, and the luminance uniformity of 85% or more.

Table 2 below compares the front luminance, the luminance at a viewing angle of 30°, and the luminance uniformity from the front to a viewing angle of 30° of the prior art (FIG. 1A) and those of the first embodiment of the present invention (FIG. 2A: when the thickness of the color conversion pixel is 15 μm and the maximum depression depth is 3 μm.

TABLE 2

|  | Conventional (FIG. 1A) | Inventive (FIG. 2A) |
|---|---|---|
| Front luminance (lux) | 235 | 286 |
| Luminance at viewing angle of 30° (luminance ratio to front, %) | 199(85%) | 274(96%) |
| Luminance uniformity (Minimum/maximum luminance ratio between front and 30°, %) | 80% | 95% |

As shown in Table 2 above, in the first embodiment according to the present invention of FIG. 2A, the front luminance, the luminance at a viewing angle of 30°, and the luminance uniformity from the front to a viewing angle of 30° were improved by 20%, 11% p, and 15% p, respectively, compared to those of the prior art (FIG. 1A).

In FIG. 2A, blue light incident on the color conversion layer 200 may be supplied through a backlight unit. The backlight unit may include a light source unit, a light guide plate, a reflective sheet, a diffusion sheet, a prism sheet, and so on. Blue light may have a wavelength in the range of 430 nm to 470 nm.

FIG. 2B shows a first modification of the first embodiment.

As shown in FIG. 2B, the first modification of the first embodiment may include a color filter layer 300 in addition to the substrate 100 and the color conversion layer 200.

The color filter layer 300 may be composed of a color filter barrier rib 310, a color filter pixel 320, and so on.

The color filter barrier rib 310 may be formed between the substrate 100 and the color conversion barrier rib 210. The color filter barrier rib 310 may space the color filter pixels 320 apart from each other in pixel units. The color filter barrier ribs 310 may surround and embed the color filter pixels 320 on the substrate 100, respectively. The color filter barrier ribs 310 may be configured to open in a direction away from the substrate 100.

The color filter barrier rib 310 may be formed of an acrylic or epoxy-based polymer.

The color filter barrier rib 310 may have a thickness of about 20% of the thickness of the color conversion layer 200, for example, 1 to 4 μm.

The color filter barrier rib 310 may be configured in the same pattern as the color conversion barrier rib 210. In this case, the color filter barrier rib 310 may be formed first, and then the color conversion barrier rib 210 may be additionally formed on the color filter barrier rib 310 through an additional process.

The color filter layer 300 may include color filter pixels 320. The color filter pixels 320 may be disposed to correspond to the color conversion pixels 222, respectively.

The color filter pixel 320 may transmit red light and absorb green and blue lights to emit red light only, transmit green light and absorb red and blue lights to emit green light only, or transmit blue light and absorb red and green lights to emit blue light only.

In the first modification of the first embodiment shown in FIG. 2B, the remaining configuration is the same as the corresponding configuration of the first embodiment in FIG. 2A, and therefore the detailed description of the remaining configuration is replaced with the related description of FIG. 2A.

Table 3 below compares the front luminance, the luminance at a viewing angle of 30°, and the luminance uniformity from the front to the viewing angle of 30° of the prior art (FIG. 1B) and those of the first modification of the first embodiment of the present invention (FIG. 2B: when the thickness of the color conversion pixel is 15 μm and the maximum depression depth is 3 μm).

TABLE 3

|  | Conventional (FIG. 1B) | Inventive (FIG 2B) |
|---|---|---|
| Front luminance (lux) | 221 | 275 |
| Luminance at viewing angle of 30° (luminance ratio to front, %) | 181(82%) | 261(95%) |
| Luminance uniformity (Minimum/maximum luminance ratio between front and 30°, %) | 81% | 95% |

As shown in Table 3 above, in the first modification of the first embodiment according to the present invention, the front luminance, the luminance at a viewing angle of 30°, and the luminance uniformity from the front to a viewing angle of 30° were improved by 24%, 13% p, and 14% p, respectively, compared to those of the prior art (FIG. 1B).

FIG. 2C shows a second modification of the first embodiment.

As shown in FIG. 2C, the second modification of the first embodiment further includes a color filter layer in addition to the substrate 100 and the color conversion layer, but has a different barrier rib structure.

As in the first modification of the first embodiment, the color filter layer is composed of a color filter barrier rib, a color filter pixel 320, and the like, but the color filter barrier rib may be formed simultaneously with the color conversion barrier rib in the same process. In this case, the color filter barrier rib and the color conversion barrier rib may constitute a one-piece barrier rib, that is, the integrated barrier rib 410.

In the second modification of the first embodiment shown in FIG. 2C, the remaining configuration is the same as the corresponding configuration of the first embodiment of FIG. 2A and the first modification thereof (FIG. 2B), and therefore the detailed description of the remaining configuration is replaced with the related description of FIGS. 2A and 2B.

Table 4 below compares the front luminance, the luminance at a viewing angle of 30°, and the luminance uniformity from the front to a viewing angle of 30° of the prior art (FIG. 1C) and those of the second modification of the first embodiment of the present invention (FIG. 2C: when the thickness of the color conversion pixel is 15 μm and the maximum depression depth is 3 μm).

TABLE 4

|  | Conventional (FIG. 1C) | Inventive (FIG 2C) |
|---|---|---|
| Front luminance (lux) | 225 | 265 |
| Luminance at viewing angle of 30° (luminance ratio to front, %) | 186(83%) | 251(95%) |
| Luminance uniformity | 81% | 96% |

TABLE 4-continued

|  | Conventional (FIG. 1C) | Inventive (FIG 2C) |
|---|---|---|
| (Minimum/maximum luminance ratio between front and 30°, %) |  |  |

As shown in Table 4 above, in the second modification of the first embodiment according to the present invention, the front luminance, the luminance at a viewing angle of 30°, and the luminance uniformity from the front to a viewing angle of 30° were improved by 18%, 12% p, and 15% p, respectively, compared to those of the prior art (FIG. 1C).

FIGS. 3A to 3C are cross-sectional views illustrating a second embodiment of a color conversion panel according to the present invention and modifications thereof.

As shown in FIGS. 3A to 3C, in the second embodiment and modifications thereof, the color conversion pixel 224 may have a curved protrusion in the light incident direction, unlike the first embodiment and modifications thereof.

The curved protrusion may have a circular shape, an elliptical shape, or the like, and may be formed by an inkjet method.

It may be preferable that the curved protrusion has a maximum protrusion height of 5 to 50% of the thickness of the color conversion pixel 224. When the color conversion pixel 224 is configured to have a thickness of 5 to 20 μm, the maximum protrusion height of the curved protrusion may be in the range of 0.25 to 10 μm. When the maximum protrusion height is set to less than 5%, that is, 0.25 μm, the front luminance, luminance at a viewing angle of 30°, and luminance uniformity from the front to a viewing angle of 30° cannot be improved by 10% or more. When the maximum protrusion height is more than 50%, that is, 10 μm, an increase in the thickness of the color conversion pixel 220 may decrease the improvement effect of the front luminance to less than 10%.

Table 5 below shows the changes of front luminance (lux), luminance at a viewing angle of 30°, and luminance uniformity from the front to a viewing angle of 30° when the thickness of the color conversion pixel 224 is 10 μm and the maximum protrusion height (height of the central region) of the curved protrusion changes in the embodiment of FIG. 3A according to the present invention.

TABLE 5

| Maximum protrusion height of curved protrusion (μm) | Front luminance (lux) | Luminance at viewing angle of 30° (%) | Luminance uniformity (%) |
|---|---|---|---|
| 0(coplanar) | 215 | 82 | 82 |
| 0.25 | 216 | 82 | 82 |
| 0.5 | 228 | 87 | 85 |
| 0.75 | 229 | 89 | 85 |
| 1.0 | 231 | 91 | 86 |
| 1.5 | 235 | 92 | 87 |
| 2.0 | 236 | 93 | 88 |
| 2.5 | 237 | 95 | 89 |
| 3.0 | 242 | 95 | 89 |
| 3.5 | 241 | 93 | 88 |
| 4.0 | 240 | 91 | 86 |
| 4.5 | 238 | 90 | 86 |
| 5.0 | 230 | 88 | 85 |
| 5.5 | 218 | 82 | 82 |
| 6.0 | 217 | 82 | 82 |
| 6.5 | 216 | 82 | 82 |

As shown in Table 5 above, it can be confirmed that the maximum protrusion height of the curved protrusion in the range of 5 to 50% of the thickness of the color conversion pixel 220, that is 0.5 to 5.0 μm is preferable, based on the criteria that satisfy the front luminance of 220 or more, the luminance at a viewing angle of 30° of 85% or more, and the luminance uniformity of 85% or more. In the second embodiment shown in FIG. 3A, the remaining configuration is the same as the corresponding configuration of the first embodiment of FIG. 2A, and therefore the detailed description of the remaining configuration is replaced with the related description of FIG. 2A.

Table 6 below compares the front luminance, the luminance at a viewing angle of 30°, and the luminance uniformity from the front to a viewing angle of 30° of the prior art (FIG. 1A) and those of the second embodiment of the present invention (FIG. 3A: when the thickness of the color conversion pixel is 15 μm and the maximum protrusion height is 3 μm).

TABLE 6

|  | Conventional (FIG. 1A) | Inventive (FIG 3A) |
|---|---|---|
| Front luminance (lux) | 235 | 296 |
| Luminance at viewing angle of 30° (luminance ratio to front, %) | 199(85%) | 284(96%) |
| Luminance uniformity (Minimum/maximum luminance ratio between front and 30°, %) | 80% | 88% |

As shown in Table 6 above, in the second embodiment according to the present invention of FIG. 3A, the front luminance, the luminance at a viewing angle of 30°, and the luminance uniformity from the front to a viewing angle of 30° were improved by 26%, 11% p, and 8% p, respectively, compared to those of the prior art (FIG. 1A).

FIG. 3B shows a first modification of the second embodiment.

As shown in FIG. 3B, the first modification of the second embodiment may further include a color filter layer 300 in addition to the substrate 100 and the color conversion layer 200.

The color filter layer 300 may include a color filter barrier rib 310, a color filter pixel 320, and the like. The color filter barrier rib 310 may be configured in the same pattern as the color conversion barrier rib 210. In this case, the color filter barrier rib 310 may be formed first, and then the color conversion barrier rib 210 may be additionally formed on the color filter barrier rib 310 through an additional process.

In the first modification of the second embodiment shown in FIG. 3B, the remaining configuration is the same as the corresponding configurations of the second embodiment of FIG. 3A and the first modification of the first embodiment of FIG. 2B, and therefore detailed description of the remaining configuration is replaced with the related descriptions of FIGS. 3A and 2B.

Table 7 below compares the front luminance, the luminance at a viewing angle of 30°, and the luminance uniformity from the front to a viewing angle of 30° of the prior art (FIG. 1B) and those of the first modification of the second embodiment of the present invention (FIG. 3B: when the thickness of the color conversion pixel is 15 μm and the maximum protrusion height is 3 μm).

TABLE 7

|  | Conventional (FIG. 1B) | Inventive (FIG 3B) |
| --- | --- | --- |
| Front luminance (lux) | 221 | 291 |
| Luminance at viewing angle of 30° (luminance ratio to front, %) | 181(82%) | 276(95%) |
| Luminance uniformity (Minimum/maximum luminance ratio between front and 30°, %) | 81% | 85% |

As shown in Table 7 above, in the first modification of the second embodiment, the front luminance, the luminance at a viewing angle of 30°, and the luminance uniformity from the front to a viewing angle of 30° were improved by 34%, 13% p, and 4% p, respectively, compared to those of the prior art (FIG. 1B).

FIG. 3C shows a second modification of the second embodiment.

As shown in FIG. 3C, the second modification of the second embodiment may further include a color filter layer in addition to the substrate 100 and the color conversion layer.

As in the first modification of the second embodiment, the color filter layer includes a color filter barrier rib, a color filter pixel, and the like, but the color filter barrier rib may be formed at the same time as the color conversion barrier rib in the same process. In this case, the color filter barrier rib and the color conversion barrier rib may constitute a one-piece barrier rib, that is, the integrated barrier rib 410.

In the second modification of the second embodiment shown in FIG. 3C, the remaining configuration is the same as the corresponding configurations of the second embodiment of FIG. 3A and the second modification of the first embodiment of FIG. 2C, and therefore detailed description of the remaining configurations is replaced with the related descriptions of FIGS. 3A and 2C.

Table 8 below compares the front luminance, the luminance at a viewing angle of 30°, and the luminance uniformity from the front to a viewing angle of 30° of the prior art (FIG. 1C) and those of the second modification of the second embodiment of the present invention (FIG. 3C: when the thickness of the color conversion pixel is 15 μm and the maximum protrusion height is 3 μm).

TABLE 8

|  | Conventional (FIG. 1C) | Inventive (FIG 3C) |
| --- | --- | --- |
| Front luminance (lux) | 225 | 290 |
| Luminance at viewing angle of 30° (luminance ratio to front, %) | 186(83%) | 272(94%) |
| Luminance uniformity (Minimum/maximum luminance ratio between front and 30°, %) | 81% | 85% |

As shown in Table 8 above, in the second modification of the second embodiment, the front luminance, the luminance at a viewing angle of 30°, and the luminance uniformity from the front to a viewing angle of 30° were improved by 29%, 11% p, and 4% p, respectively, compared to those of the prior art (FIG. 1C).

FIG. 4 is a process cross-sectional view illustrating a first method of manufacturing a color conversion panel according to the present invention.

In the first manufacturing method, first, a substrate 100 such as glass or plastic may be prepared, as shown in (a) of FIG. 4.

In (b) of FIG. 4, a color conversion barrier rib 210 for spatially separating color conversion pixels may be formed on the substrate 100. The color conversion barrier rib 210 may be formed of an acrylic or epoxy-based polymer by a method such as photolithography.

In (c1) and (c2) of FIG. 4, a color conversion member including quantum dots may be formed in the separated space of the color conversion barrier rib 210 with an inkjet method. By forming the color conversion member with the inkjet method, the open surface may be formed as a curved surface. By injecting the color conversion member lower than the color conversion barrier rib 210, the color conversion pixel 222 having a curved depression may be formed as shown in (c1) of FIG. 4. Alternatively, the color conversion member may be injected higher than the color conversion barrier rib 210 to form the color conversion pixel 224 having a curved protrusion as shown in (c2) of FIG. 4.

FIG. 5 is a process cross-sectional view illustrating a second method of manufacturing a color conversion panel according to the present invention.

In the second manufacturing method, first, a substrate 100 such as glass or plastic may be prepared, as shown in (a) of FIG. 5.

In (b) of FIG. 5, a color filter barrier rib 310 for spatially separating color filter pixels may be formed on the substrate 100. The color filter barrier rib 310 may be formed of an acrylic or epoxy-based polymer by a method such as photolithography.

In (c) of FIG. 5, a color filter member emitting red light, green light, or blue light may be injected into the separated space of the color filter barrier rib 310 by an inkjet method to form a color filter pixel 320.

In (d) of FIG. 5, a color conversion barrier rib 210 for spatially separating color conversion pixels may be formed on the color filter barrier rib 310. The color conversion barrier rib 210 may be formed of an acrylic or epoxy-based polymer by a method such as photolithography.

In (e1) and (e2) of FIG. 5, a color conversion member including quantum dots may be injected into the separated space of the color conversion barrier rib 210 with an inkjet method to form a color conversion pixel. By forming the color conversion member with an inkjet method, the surface may be formed as a curved surface. By injecting the color conversion member lower than the color conversion barrier rib 210, the color conversion pixel 222 having a curved depression may be formed as shown in (e1) of FIG. 5. Alternatively, the color conversion member may be injected higher than the color conversion barrier rib 210 to form the color conversion pixel 224 having a curved protrusion as shown in (e2) of FIG. 5.

FIG. 6 is a process cross-sectional view illustrating a third method of manufacturing a color conversion panel according to the present invention.

In the third manufacturing method, first, a substrate 100 such as glass or plastic may be prepared, as shown in (a) of FIG. 6.

In (b) of FIG. 6, a one-piece integrated barrier rib 410 for spatially separating color filter pixels and color conversion pixels at the same time may be formed on the substrate 100. The integrated barrier rib 410 may be formed of an acrylic or epoxy-based polymer by a method such as photolithography.

In (c) of FIG. 6, a color filter member emitting red light, green light, or blue light may be injected into the separated space of the integrated barrier rib 410 up to about 20% of the height of the integrated barrier rib 410 to form a color filter pixel.

In (d1) and (d2) of FIG. 6, a color conversion member including quantum dots may be injected into the remaining upper separated space of the integrated barrier rib 410 with an inkjet method to form a color conversion pixel. By forming the color conversion member with an inkjet method, the surface may be formed as a curved surface. By injecting the color conversion member lower than the integrated barrier rib 410, the color conversion pixel 222 having a curved depression may be formed as shown in (d1) of FIG. 6. Alternatively, the color conversion member may be injected higher than the integrated barrier rib 410 to form the color conversion pixel 224 having a curved protrusion as shown in (d2) of FIG. 6.

FIGS. 7A and 7B are images taken with an electron microscope of the top surface and cross-section of the actual color conversion panel having the structure of FIG. 4 (c1), respectively, and FIGS. 8A and 8B are images taken with an electron microscope of the top surface and cross-section of the actual color conversion panel having the structure of FIG. 4 (c2), respectively.

FIGS. 9A to 9C are cross-sectional views illustrating a third embodiment of a color conversion panel according to the present invention and modifications thereof.

As shown in FIG. 9A, the third embodiment of a color conversion panel according to the present invention may include a substrate 100, a light source 150, a color conversion layer 500, and so on.

The substrate 100 supports the light source 150 and the color conversion layer 500, and may be made of transparent material such as glass, plastic, or the like. The substrate 100 may be made of a flexible or rigid material.

The light source 150 may supply white light or blue light to the color conversion layer 500. The light source 150 may be a blue light backlight unit, and may constitute an array, that is, may be arranged spaced apart from each other while being recessed in the substrate 100 or protruding from the upper surface.

The color conversion layer 500 is formed on the substrate 100 and may include a color conversion barrier rib 510, a color conversion pixel 520, and the like.

The color conversion barrier rib 510 may be configured in a form in which the light source 150 is embedded on the substrate 100 while opening a direction away from the substrate 100. The color conversion barrier rib 510 may space the color conversion pixels 520 apart from each other in pixel units.

The color conversion pixel 520 may be inserted in the color conversion barrier rib 510 while covering the light source 150 on the substrate 100.

The color conversion pixel 520 may have a curved color conversion protrusion in the light emission direction, as shown in FIG. 9A. The curved color conversion protrusion may have a circular shape, an elliptical shape, or the like. The curved color conversion protrusion may be formed by injecting a color conversion member with an inkjet method.

The curved color conversion protrusion may have a maximum protrusion height of 5 to 50% of the minimum thickness of the color conversion pixel 520. When the color conversion pixel 520 is configured to have a minimum thickness of 5 to 20 μm, the maximum protrusion height of the curved color conversion protrusion may be in the range of 0.25 to 10 μm. When the maximum protrusion height is set to less than 5%, that is, 0.25 μm, it is difficult to enlarge the viewing angle by 10° or more, or to increase the aperture ratio by 2% or more. When the maximum protrusion height is more than 50%, that is, 10 μm, an increase in the thickness of the color conversion pixel 520 may decrease the front luminance to cause the viewing angle to fall by 10° or more.

Table 9 below shows the changes of front luminance and a viewing angle when the thickness of the color conversion pixel 520 is 10 μm and the maximum protrusion height (height of the central region) of the curved color conversion protrusion changes in the embodiment of FIG. 9A according to the present invention.

TABLE 9

| Maximum protrusion height of curved color conversion protrusion (μm) | Front luminance (lux) | Viewing angle (°) |
| --- | --- | --- |
| 0(coplanar) | 215 | 65 |
| 0.25 | 218 | 67 |
| 0.5 | 225 | 72 |
| 0.75 | 228 | 75 |
| 1.0 | 235 | 78 |
| 2.0 | 242 | 82 |
| 3.0 | 253 | 84 |
| 4.0 | 254 | 83 |
| 4.5 | 245 | 80 |
| 5.0 | 235 | 80 |
| 5.5 | 218 | 71 |
| 6.0 | 210 | 70 |
| 6.5 | 205 | 68 |

As shown in Table 9 above, it can be confirmed that the maximum protrusion height of the curved color conversion protrusion in the range of 5 to 50% of the thickness of the color conversion pixel 520, that is, 0.5 to 5.0 μm is preferable, based on the criteria that satisfy the front luminance of 220 or more and the viewing angle of 70° or more.

Table 10 below compares the external light reflection luminance (lux), viewing angle (a viewing angle at which the luminance corresponding to 80% of the front luminance is measured, °), and aperture ratio (the ratio of the area where the light is emitted from the color conversion layer divided by the total area, %) of the prior art (in FIG. 1A, when a light source is disposed on a substrate) and those of the third embodiment (FIG. 9A: when the minimum thickness of the color conversion pixel is 15 μm and the maximum protrusion height of the curved protrusion is 3 μm).

TABLE 10

| | Conventional (modification of FIG. 1A) | Inventive (FIG. 9A) |
| --- | --- | --- |
| External light reflection luminance (lux) | 4.5 | 4.4 |
| Viewing angle (°) | 65 | 85 |
| Aperture ratio (%) | 88 | 97 |

As shown in Table 10 above, the third embodiment of FIG. 9A can achieve the effect of reducing the external light reflection by 0.1 lux, increasing the viewing angle by 20°, and increasing the aperture ratio by 9% p, compared with the structure of the prior art.

FIG. 9B shows a first modification of the third embodiment.

As shown in FIG. 9B, the first modification of the third embodiment may include a color filter layer 600 in addition to the substrate 100, the light source 150, and the color conversion layer 500.

The color filter layer 600 may include a color filter barrier rib 610, a color filter pixel 620, and so on.

The color filter barrier rib 610 may be formed on the color conversion barrier rib 510. The color filter barrier rib 610 may space the color filter pixels 620 apart from each other in pixel units. The color filter barrier ribs 610 may surround and embed the color filter pixels 620 on the color conversion layer 500, respectively. The color filter barrier ribs 610 may be configured to open in a direction away from the color conversion layer 500.

The color filter barrier rib 610 may be formed of an acrylic or epoxy-based polymer.

The color filter barrier rib 610 may have a thickness of about 20% of the thickness of the color conversion layer 500, for example, 1 to 4 μm.

The color filter barrier rib 610 may be configured in the same pattern as the color conversion barrier rib 510. In this case, the color conversion barrier rib 510 may be formed first, and then the color filter barrier rib 610 may be additionally formed on the color conversion barrier rib 510 through an additional process.

The color filter pixels 620 are inserted in the color filter barrier ribs 610 in pixel units to correspond to the color conversion pixels 520, respectively.

The color filter pixel 620 may have a curved color filter protrusion in the light emission direction, as shown in FIG. 9B. The curved color filter protrusion may have a circular shape, an elliptical shape, or the like. The curved color filter protrusion may be formed by injecting a color filter member with an inkjet method.

The curved color filter protrusion may have the same shape as the curved surface of the curved color conversion protrusion.

In the first modification of the third embodiment shown in FIG. 9B, the remaining configuration is the same as the corresponding configuration of FIG. 9A, and therefore detailed description of the remaining configuration is replaced with the related description of FIG. 9A.

Table 11 below compares the external light reflection luminance (lux), viewing angle (°), and aperture ratio (%) of the prior art (in FIG. 1B, when a light source is disposed on a substrate and the color filter layer is moved to the top of the color conversion layer) and those of the first modification of the third embodiment (FIG. 9B: when the minimum thickness of the color conversion pixel is 15 μm and the maximum protrusion height of the curved protrusion is 3 μm).

TABLE 11

|  | Conventional (modification of FIG. 1B) | Inventive (FIG. 9B) |
| --- | --- | --- |
| External light reflection luminance (lux) | 2.2 | 1.9 |
| Viewing angle (°) | 67 | 85 |
| Aperture ratio (%) | 89 | 96 |

As shown in Table 11 above, the first modification of the third embodiment can achieve the effect of reducing the external light reflection by 0.3 lux, increasing the viewing angle by 18°, and increasing the aperture ratio by 7% p, compared with the structure of the prior art.

FIG. 9C shows a second modification of the third embodiment.

As shown in FIG. 9C, the second modification of the third embodiment further includes a color filter layer in addition to the substrate 100, the light source 150 and the color conversion layer, but has a different barrier rib structure from FIG. 9B.

As in the first modification of the third embodiment, the color filter layer is composed of a color filter barrier rib, a color filter pixel, and the like, but the color filter barrier rib may be formed simultaneously with the color conversion barrier rib in the same process. In this case, the color filter barrier rib and the color conversion barrier rib may constitute a one-piece barrier rib, that is, the integrated barrier rib 710.

In the second modification of the third embodiment shown in FIG. 9C, the remaining configuration is the same as the corresponding configurations of FIGS. 9A and 9B, and therefore the detailed description of the remaining configuration is replaced with the related descriptions of FIGS. 9A and 9B.

Table 12 below compares the external light reflection luminance (lux), viewing angle (°), and aperture ratio (%) of the prior art (in FIG. 1C, when a light source is disposed on a substrate and the color filter layer is moved to the top of the color conversion layer) and those of the second modification of the third embodiment (FIG. 9C: when the minimum thickness of the color conversion pixel is 15 μm, and the maximum protrusion height of the curved protrusion is 3 μm).

TABLE 12

|  | Conventional (modification of FIG. 1C) | Inventive (FIG 9C) |
| --- | --- | --- |
| External light reflection luminance (lux) | 2.1 | 1.5 |
| Viewing angle (°) | 69 | 88 |
| Aperture ratio (%) | 88 | 97 |

As shown in Table 12 above, the second modification of the third embodiment can achieve the effect of reducing external light reflection by 0.6 lux, increasing the viewing angle by 19°, and increasing the aperture ratio by 9% p, compared with the structure of the prior art.

FIGS. 10A to 10C are cross-sectional views illustrating a fourth embodiment of a color conversion panel according to the present invention and modifications thereof.

In the fourth embodiment and modifications thereof shown in FIGS. 10A to 10C, an overcoat layer 700 can be further formed on the color conversion layer 500 or the color filter layer 600 of the embodiment and modifications thereof shown in FIGS. 9A to 9C.

The overcoat layer 700 may planarize and protect the color conversion layer 500 or the color filter layer 600 thereunder. As the overcoat layer 700, a material used as a transparent insulation layer may be used without any particular limitation. The overcoat layer 700 may be formed of, for example, an inorganic insulation material such as silicon oxide or silicon nitride, or an organic insulation material such as a photocurable resin composition.

In the fourth embodiment and the modifications thereof shown in FIGS. 10A to 10C, the remaining configurations are the same as the corresponding configurations of FIGS. 9A to 9C, and therefore the detailed descriptions of the remaining configurations are replaced with the related descriptions of FIGS. 9A to 9C.

FIGS. 11A and 11B are cross-sectional views illustrating a fifth embodiment of a color conversion panel according to the present invention and a modification thereof.

As shown in FIGS. 11A and 11B, in the fifth embodiment and its modification, a curved protrusion is formed only in the color conversion pixel 520 in the light emission direction, and the color filter pixel 622 stacked thereon may be configured with a flat surface without a curved protrusion in the light emission direction.

In the fifth embodiment and its modification shown in FIGS. 11A and 11B, the remaining configurations are the same as the corresponding configurations of FIGS. 9B and 9C, and therefore the detailed descriptions of the remaining configurations are replaced with the related descriptions of FIGS. 9B and 9C.

Table 13 below compares the external light reflection luminance (lux), viewing angle (°), and aperture ratio (%) of the prior art (in FIG. 1B, when a light source is disposed on a substrate and the color filter layer is moved to the top of the color conversion layer) and those of the first modification of the fifth embodiment (FIG. 11A: when the minimum thickness of the color conversion pixel is 15 μm and the maximum protrusion height of the curved protrusion is 3 μm).

TABLE 13

|  | Conventional (modification of FIG. 1B) | Inventive (FIG. 11A) |
|---|---|---|
| External light reflection luminance (lux) | 2.2 | 1.8 |
| Viewing angle (°) | 67 | 80 |
| Aperture ratio (%) | 89 | 91 |

As shown in Table 13 above, the first modification of the fifth embodiment can achieve the effect of reducing external light reflection by 0.4 lux, increasing the viewing angle by 13°, and increasing the aperture ratio by 2% p, compared with the structure of the prior art.

Table 14 below compares the external light reflection luminance (lux), viewing angle (°), and aperture ratio (%) of the prior art (in FIG. 1C, when a light source is disposed on a substrate and the color filter layer is moved to the top of the color conversion layer) and those of the second modification of the fifth embodiment (FIG. 11B: when the minimum thickness of the color conversion pixel is 15 μm and the maximum protrusion height of the curved protrusion is 3 μm).

TABLE 14

|  | Conventional (modification of FIG. 1C) | Inventive (FIG 11B) |
|---|---|---|
| External light reflection luminance (lux) | 2.1 | 1.4 |
| Viewing angle (°) | 69 | 81 |
| Aperture ratio (%) | 88 | 92 |

As shown in Table 14 above, the second modification of the fifth embodiment can achieve the effect of reducing external light reflection by 0.7 lux, increasing the viewing angle by 12°, and increasing the aperture ratio by 4% p, compared with the structure of the prior art.

The curved protrusion of the color conversion pixel 520 or the color filter pixel 620 as described above may be formed by injecting the color conversion member or the color filter member higher than the barrier rib 510, 610 or 710 when the color conversion member or the color filter member is formed in the separated space of the color conversion barrier rib 510 or the color filter barrier rib 610 with an inkjet method.

FIG. 12 is a top view photograph of an actual example of the third embodiment of the color conversion panel according to the present invention, taken with an electron microscope.

Referring to FIG. 12, in another example of the color conversion panel according to the present invention, it can be seen that the color filter layer area or the color conversion pixel area between the barrier ribs has a structure that protrudes upward in a curved shape.

Although particular embodiments of the present invention have been shown and described, it will be understood by those skilled in the art that it is not intended to limit the present invention to the preferred embodiments, and it will be obvious to those skilled in the art that various changes and modifications may be made without departing from the spirit and scope of the invention.

The scope of the present invention, therefore, is to be defined by the appended claims and equivalents thereof.

DESCRIPTION OF REFERENCE NUMERALS

100: substrate
150: light source
200,500: color conversion layer
210,510: color conversion barrier rib
220,222,224,520: color conversion pixel
300,600: color filter layer
310,610: color filter barrier rib
320,620,622: color filter pixel
410,710: integrated barrier rib
700: overcoat layer

The invention claimed is:

1. A color conversion panel, comprising:
a substrate in which a plurality of light sources are spaced apart and combined;
a color conversion layer including a color conversion barrier rib that spatially separates a space in pixel units while embedding the plurality of light sources respectively on the substrate, and a color conversion pixel inserted into the separated space of the color conversion barrier rib and having a curved protrusion in a light emission direction, and
a color filter layer coupled to the color conversion layer in the light emission direction,
wherein the color filter layer includes:
a color filter barrier rib formed on the color conversion barrier rib; and
a color filter pixel inserted in the color filter barrier rib and having a curved color filter protrusion in the light emission direction.

2. The color conversion panel of claim 1, wherein:
the color conversion pixel has a thickness of 5 to 20 μm; and
a maximum protrusion height of the curved protrusion is 5 to 50% of the thickness of the color conversion pixel.

3. The color conversion panel of claim 1, wherein the curved protrusion has a circular or elliptical shape.

4. The color conversion panel of claim 1, wherein the color conversion pixel is formed by an inkjet method.

5. The color conversion panel of claim 1, wherein:
the color filter pixel has a thickness of 1 to 10 μm; and
a maximum protrusion height of the curved color filter protrusion is 5 to 50% of the thickness of the color filter pixel.

6. The color conversion panel of claim 1, wherein the curved color filter protrusion has a circular or elliptical shape.

7. The color conversion panel of claim 1, wherein the color filter pixel is formed by an inkjet method.

8. The color conversion panel of claim 1, wherein the color conversion barrier rib and the color filter barrier rib are of a separate type, which are formed separately and stacked.

9. The color conversion panel of claim 1, wherein the color conversion barrier rib and the color filter barrier rib are of an integrated type, which are formed simultaneously.

\* \* \* \* \*